United States Patent [19]
Howard

[11] Patent Number: 5,848,899
[45] Date of Patent: Dec. 15, 1998

[54] METHOD AND DEVICE FOR SIMULATING WEIGHTLESSNESS

[75] Inventor: Ian P. Howard, Thornhill, Canada

[73] Assignee: Centre for Research in Earth and Space Technology, North York, Canada

[21] Appl. No.: 852,601

[22] Filed: May 7, 1997

[51] Int. Cl.[6] .................................................. G09B 9/08
[52] U.S. Cl. ................................ 434/34; 434/55; 472/59
[58] Field of Search ................................ 434/30, 55, 34, 434/35, 57; 472/130, 59, 60

[56] References Cited

U.S. PATENT DOCUMENTS

| | | |
|---|---|---|
| 3,010,219 | 11/1961 | Schueller . |
| 3,041,741 | 7/1962 | Barker, Jr. . |
| 3,161,968 | 12/1964 | De Boy et al. . |
| 3,295,223 | 1/1967 | Zeff et al. . |
| 3,449,843 | 6/1969 | Richter et al. . |
| 3,468,533 | 9/1969 | House, Jr. . |
| 3,516,179 | 6/1970 | Dane . |
| 4,678,438 | 7/1987 | Vykukal . |
| 5,584,697 | 12/1996 | Trumbull . |

*Primary Examiner*—Kien T. Nguyen
*Attorney, Agent, or Firm*—Lynn C. Schumacher; Hill & Schumacher; Dowell & Dowell, P.C.

[57] ABSTRACT

The present invention provides a method and device for producing an illusion of weightlessness. An enclosed room having walls, a floor and a ceiling defining an interior is provided. A plurality of visually polarized objects are rigidly secured to the walls, ceiling or floor to indicate an up and down direction. A user is secured into a cushioned user support member mounted in the enclosed room and rotated into the supine posture. The room is then rotated into alignment with the user's body. The room containing a rich variety of visually polarized objects having recognizable tops and bottoms still appears upright when the room and person in the support member are both rotated at an angle of 90° from the upright position. The gravity sense organs in the inner ear (otolith organs) which normally indicate when the head is erect, are not powerful enough in most people to overcome the strong contradictory visual information. Also, the otolith organs produce a weaker signal when the body is supine when the body is incline back 90° than when it is erect. The soft padding is used to reduce contradictory information arising from pressure sensations in the back as the user is rotated to the supine position. A tethered object such as a ball on a thread is hanging from the wall in front of the secured user so that when the room is moved into alignment with the user's body the tethered object hangs out perpendicularly to the wall. The relative movement of the tethered object with respect to the rigidly secured visually polarized objects provides visual stimuli to the user suggestive of a weightless environment.

28 Claims, 5 Drawing Sheets

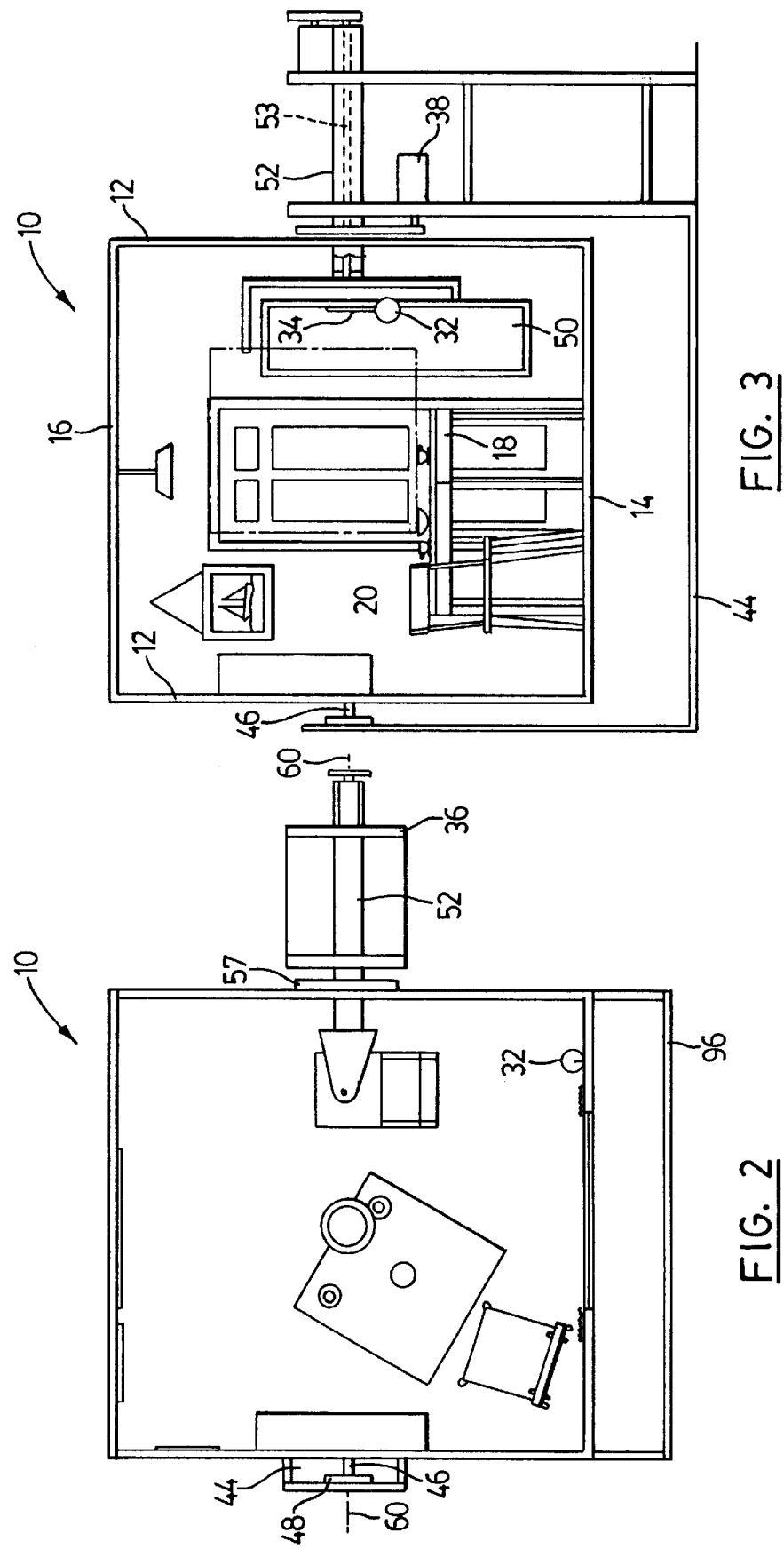

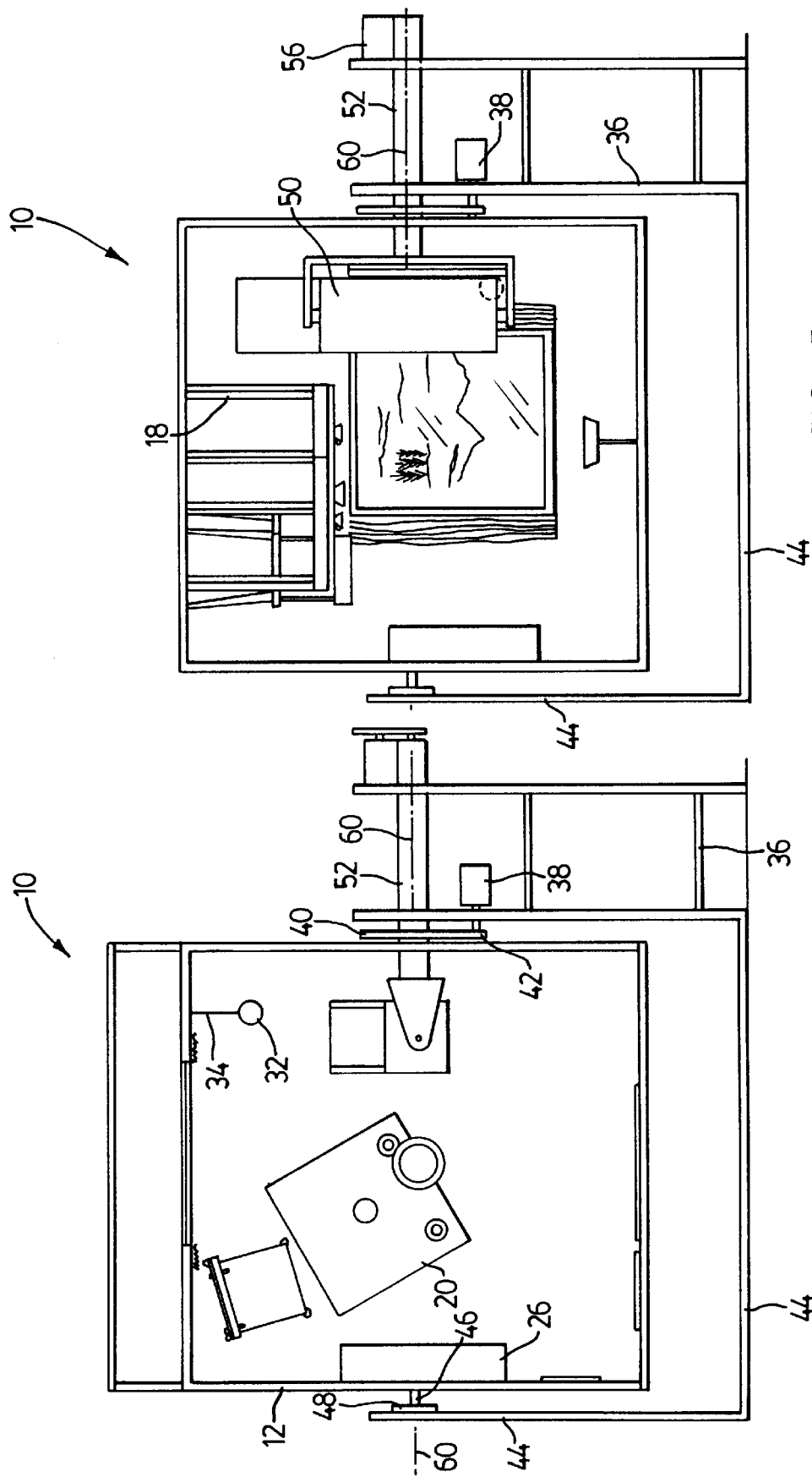

METHOD AND DEVICE FOR SIMULATING WEIGHTLESSNESS

FIELD OF THE INVENTION

The present invention relates to a method and device for simulating the experience of an astronaut in space, and more particularly to a method and device for producing an illusion of weightlessness.

BACKGROUND OF THE INVENTION

With the advent of activity in space, there is a need for methodologies and devices to mimic the conditions of weightlessness for training astronauts to live and work in space. Various devices are known for simulating conditions in space experienced by astronauts. In true weightlessness, pressure sensations and sensations arising from the otolith organs do not vary as a function of body orientation. A KC135 aircraft flying in parabolic orbits is used by NASA to create a series of 30 second periods of weightlessness. This is an expensive procedure and the repeated alternations between zero-gravity and 2-gravity produce sickness in many people. On the ground, pressure sensations associated with gravity can be eliminated by immersion in water, but the utricles still respond to gravity and objects heavier than water still fall.

A large water tank is used by NASA to familiarize astronauts with sensations of being freely suspended, see for example U.S. Pat. No. 4,678,438. For the same purpose, trainee astronauts can be suspended on a gimbaled support that allows them to move freely in any direction or rotate about any axis. Examples of such devices are taught in U.S. Pat. Nos. 3,449,843 and 3,516,179. These devices do not involve visual displays. Furthermore, skin pressure and the otolith-organs indicate the true direction of gravity. NASA has built a large sphere within which a person observes a projected computer-generated image of the space shuttle interior. The movements of the image are slaved to the movements of the observer. The observer remains upright and does not feel weightless in this device.

The direction of gravity acting on the otolith organs can be altered with respect to the visually defined vertical by rotating people in a centrifuge. In one device, centrifugal force holds observers on the vertical wall of the centrifuge after the support surface beneath the feet has been lowered (U.S. Pat. No. 3,468,533). Observers' bodies are locked in position and they experience nauseating Coriolis effects when they move the head. Objects cannot be handled in this situation.

U.S. Pat. No. 3,010,219 to Schueller is directed to a zero gravity sensor having three interconnected spherically shaped rooms. One of the rooms contains an astronaut support chair positioned under solar lamps. Another of the spherical rooms contains a centrifuge. U.S. Pat. No. 3,041,741 to Barker is directed to a space flight simulator specifically designed to emulate the effects of acceleration and deceleration and comprises railway tracks on a vertical grade and a capsule to house a person which rides on the tracks. U.S. Pat. No. 3,295,223 issued to Zeff et al. teaches a closed environmental simulator for training a three man crew for working in a space capsule. U.S. Pat. No. 5,584,697 issued to Trumball discloses a simulator comprising a suspended passenger platform with motion actuators coupled to a controller and an audio-visual system.

Therefore, it would be advantageous to provide a method and device for simulating the effect of weightlessness which is safe and can be utilized for extended periods of time for use in comprehensive training regimes cost effectively.

SUMMARY OF THE INVENTION

It is an object of the present invention to provide a method and device for producing a sensation of weightlessness. More particularly it is an object of the present invention to provide a method and device which visual information is used to override information from the non-visual gravity sense organs to lead the observer to believe they are in a weightless environment.

The present invention provides a method for producing an illusion of weightlessness. The method comprises providing an enclosed room containing visually polarized objects rigidly mounted in the room that indicate an up direction and a down direction with respect to gravity; securing a user in a preselected position in the enclosed room and moving the user into a substantially supine posture. The method includes moving the enclosed room to align it with the user's body in the substantially supine posture so that a true direction of gravity signaled by non-visual sense organs of said user's body is substantially orthogonal to an apparent direction of gravity signaled by visual sense organs of said user observing said visually polarized objects.

The method in this aspect may include providing a tethered object freely hanging in a first position in the enclosed room in an upright position so that moving the room causes the tethered object to move from the first position to hang in a second position to give the illusion of floating.

In another aspect of the invention there is provided a method for producing an illusion of weightlessness comprising providing an enclosed room having walls, a floor and a ceiling defining an interior, and a plurality of visually polarized objects rigidly secured to the walls, ceiling or floor. A user is secured into a cushioned support member mounted in the enclosed room and the support member is moved until the user is in a supine position. The room is then moved until it is aligned with said user's body.

The present invention provides an apparatus for producing an illusion of weightlessness. The apparatus comprises an enclosed chamber having an interior and an entrance and means for changing the position and orientation of the enclosed chamber. Included is a support means located inside the enclosed chamber for supporting a user and means for securing the user to the support means. The apparatus includes means for changing the position and orientation of the support means relative to the chamber and a plurality of visually polarized objects located in various positions within the chamber. The visually polarized objects are fixed in position so that they do not move relative to the chamber when the chamber is moved.

In this aspect of the invention the apparatus may include at least one object attached to a flexible tether, the tether being anchored in the interior of the enclosed chamber within a field of view of the person located on the support means.

In this aspect of the invention the room may also have a first axis of rotation and the support member may have a second axis of rotation with the first and second axes of rotation being coincident.

In another aspect of the invention there is provided an apparatus for producing an illusion of weightlessness. The apparatus comprises an enclosed chamber having an interior and an entrance, means for rotating the enclosed chamber and a support surface located on the interior of the chamber. A support member is located inside the enclosed chamber for supporting a user and includes means for securing the user to the support member. The support member includes means for producing an air cushion below the support member for elevating the support member above the support surface. A plurality of visually polarized objects are located in various positions within the chamber that are fixed in position so that they do not move relative to the chamber when the chamber is moved.

The room containing a rich variety of visually polarized objects having recognizable tops and bottoms still appears upright when the room and person in the support member are both inclined at an angle from the upright position. The gravity sense organs in the inner ear (otolith organs) which normally indicate when the head is erect, are not powerful enough in most people to overcome the strong contradictory visual information. Also, the otolith organs produce a weaker signal when the body is supine when the body is incline back 90° than when it is erect. The soft padding is used to reduce contradictory information arising from pressure sensations in the back as the user is rotated to the supine position.

BRIEF DESCRIPTION OF THE DRAWINGS

The following is a description, by way of example only, of a method and device for producing an illusion of weightlessness in accordance with the present invention, reference being had to the accompanying drawings, in which:

FIG. 2 is a plan view of the room of FIG. 1 looking through the roof of the room;

FIG. 3 is a vertical sectional view of the room of FIG. 1;

FIG. 4 is a sectional view of the room of FIG. 1 rotated back 90° or counterclockwise by the motor on the right hand portion of the drawing;

FIG. 5 is a view of the room upside down relative to the view of FIG. 3;

DETAILED DESCRIPTION OF THE INVENTION

Figure 1:
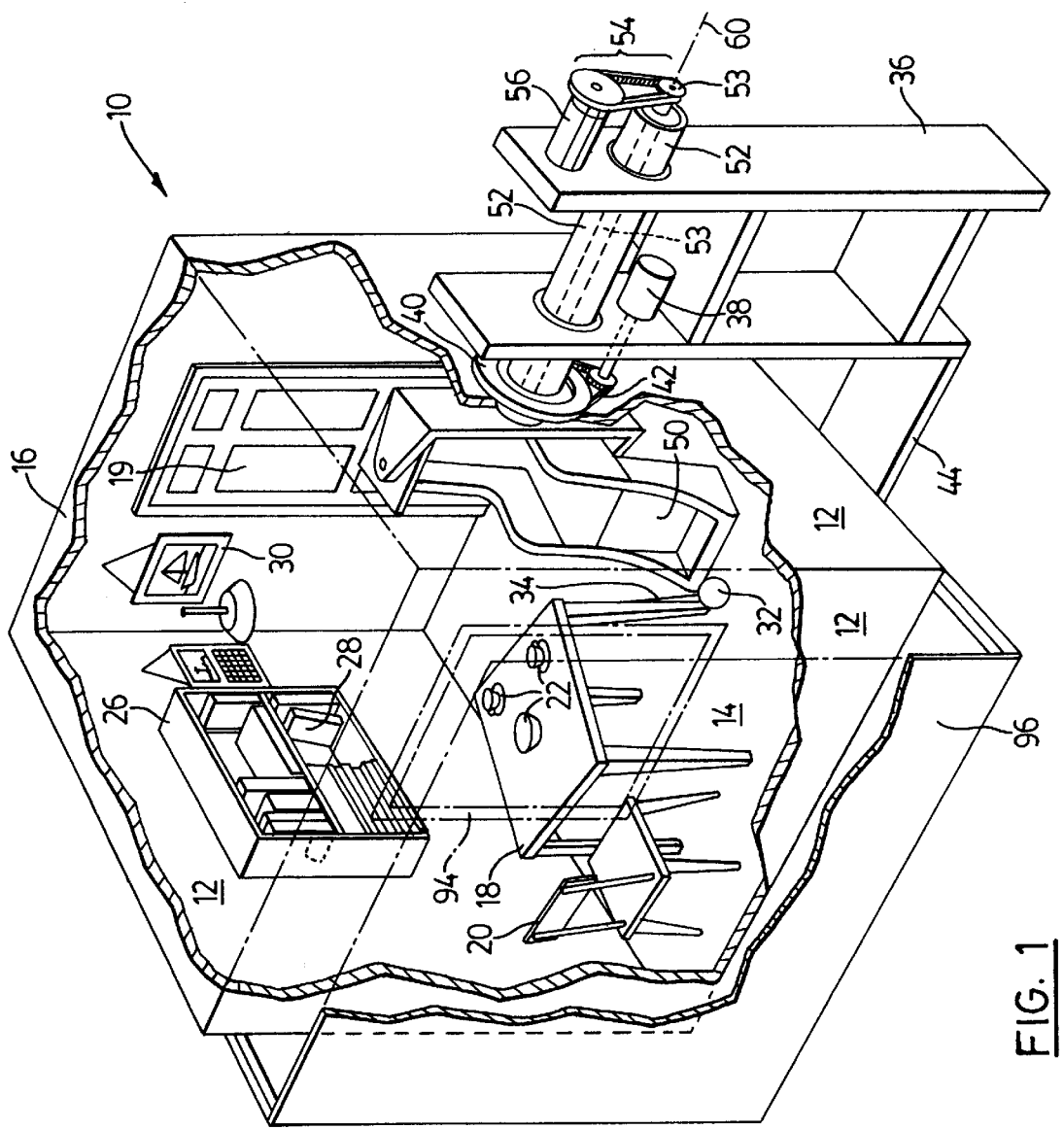
FIG. 1 is a perspective cut-away view of an enclosed room constructed in accordance with the present invention.

With reference to FIG. 1, an enclosed room is shown generally at 10. The enclosed room includes walls 12, a floor 14, a ceiling 16 and the room is accessed by a door 19. A table 18 and chair 20 are attached to the floor 14 so that when the room is moved the table and chair remain in position relative to the room and are moved with the room. The walls 12 are papered with wallpaper depicting any objects which have an identifiable top or bottom (visually polarized). A carpet may be placed on the floor and a lamp rigidly secured to the ceiling or wall. The cup and saucers 22 are also glued or otherwise bonded to the top of table 18 so they remain in position. Similarly, a book shelf 26 is firmly affixed to wall 12 and books 28 are held in place in the bookshelf so that when the room is rotated they remain on the bookshelf. A picture 30 is secured to wall 12. A variety of visually polarized objects, such as shoes and a basket are glued to the floor. All these visually polarized objects are glued or otherwise bolted in place so that when the room rotates they stay in place. The exception is an object 32 freely suspended by a string tether 34 from wall 12 in the field of view of a user.

A window 94 is positioned in opposed wall 12 from door 19. Spaced behind window 94 is box 96. A photograph or mural is attached to box 96 so that the user when looking through window 94 observes an outdoor scene and has the illusion of looking through a real window. Fluorescent lights (not shown) may also be used to provide the illusion of sunlight.

A support frame 36 is located on the exterior of room 10 and a motor 38 is mounted on the frame 36. A steel shaft (not shown) mounted in the centre wall 12 is supported on a bearing supported on frame 36. A steel annulus (not shown) is mounted in the centre of the outside surface of wall 12 opposite the shaft. The annulus rides on two bearings supported on frame 36. A large pulley 40 is attached to the outside of the annulus and connected by a belt 42 to a small pulley driven by a geared motor 38. Motor 38 may for example be a ½ or one horsepower servo motor. Pulley 40 has a rotational axis 60 and is preferably attached at the vertical and horizontal centre of wall 12. Referring to FIG. 4, room 10 is raised above the ground a sufficient distance so it can freely rotated about axis 60 and a large U-shaped bracket 44 is provided with a shaft 46 riding on a bearing assembly 48 attached to the bracket 44 allows rotation of room 10. When motor 38 is activated room 10 can be rotated about axis 60 through 360°.

A user support member such as a chair 50 is located on the interior of room 10 and a tube 52 containing a shaft 53 which is rigidly attached to the chair and extends through wall 12 of the room. The chair 50 extends the full length of the user and includes a foot and head rest. The inside of chair 50 including the head, leg and foot rest are lined with soft foam padding and the person is restrained in the chair with for example a five point harness (not shown).

Tube 52 containing shaft 53 is mounted in frame 36 and shaft 53 is connected by a gear box and pulley assembly 54 to a motor 56 so that rotation of the motor rotates shaft 53 and chair 50 about rotational axis 60. Motor 56 may, for example, be a ½ or one horsepower servo motor. When motor 56 is activated chair 50 rotates about rotational axis 60 through 360°. Shaft 53 supports chair 50 at a point corresponding approximately to waist height of a user sitting the chair and the chair faces at right angles to its rotational axis 60. The rotation of both chair 50 and room 10 is controlled by an operator located on the exterior of the room. It will be appreciated that the axis of rotation of the chair and room need not be coincident.

The user may be equipped with a head set for communication with the operator on the exterior of room 10. The chair may also be mounted on a vertical gimbal support so that the person sitting in the chair can be made to face in any of three directions.

The illusion of weightlessness is created in the following way. The person is strapped into the cushioned upright chair 50 with the room in its natural upright position as shown in FIGS. 1 or 3. The chair 50 and room 10 are then rotated backward through 90° until the person is in a supine posture looking up at wall 12 of the room which would normally be vertical but is now horizontal, see FIG. 4. It has been observed that some test subjects were not able to discern that he or she was being rotated to the supine position when the subject and room were moved at the same time and rate into the supine position. This is particularly noticeable when sufficient padding is used so that the observer does not feel pressure on his or her back, head and legs as they are being moved. The inventor has observed that most people experience the illusion that they are still sitting upright in an upright room since both the chair and room were moved at the same time. The object 32 which was hanging freely from the facing wall when the wall was vertical now appears to be suspended in mid air at 90° to the wall 12. When the person extends his or her arms out in front the arms feel as if they are floating in the illusory up-down direction.

People who do not experience the elevation illusion with this procedure usually do so with the following procedure. The chair 50 with the person strapped in is rotated back into the supine posture with the room 10 left in the normal upright position. After a short period the person is told he or she will be returned to the upright vertical position. In fact the person is left in the supine position and the room is rotated back through 90° until it is aligned with the person's body axis, see FIG. 4. The inventor has found that most people experience the elevation illusion with this procedure.

The user strapped into the chair 50 with the door closed cannot visually determine his movement relative to the room exterior when either the room or chair, or both, are being moved. The room containing a rich variety of visually polarized objects having recognizable tops and bottoms still appears upright when the room and person in the support member are both inclined at an angle from the upright position. The gravity sense organs in the inner ear (otolith organs) which normally indicate when the head is erect, are not powerful enough in most people to overcome the strong contradictory visual information. Also, the otolith organs produce a weaker signal when the body is supine, that is when the body is inclined back 90°, than when it is erect. The soft padding is used to reduce contradictory information arising from pressure sensations in the back as the user is rotated to the supine position. The presence of a tethered object accentuates the effect by appearing to be levitated as will be more fully discussed below.

In the device described herein, observers are moved into the supine posture in the enclosed room and the room rotated 90° so that it is aligned with the body. The visual information about 'up' and 'down' overrides the conflicting information from the non-visual gravity sense organs. Observers feel upright in an upright room. The true direction of gravity signaled by the non-visual sense organs is orthogonal to the apparent direction of gravity signaled by the visual surrounding. As in weightlessness, pressure sensations and sensations arising from the otolith organs do not vary as a function of body orientation within the plane parallel to the assumed direction of gravity. Observers ignore the true direction of gravity which thus becomes irrelevant to sensations and tasks defined within planes parallel to the assumed direction of gravity. Using the method and device of the present invention, observers feel weightless. When a tethered object such as ball 32 on string 34 is present and within the field of view of the user present, it is actually hanging down but appears to the observer to be levitated. Astronauts who have experienced weightlessness in the KC135 aircraft that have confidentially tested the method and device disclosed herein attest to the similarity between true weightlessness and the simulated weightlessness created by the levitation illusion.

Other relative orientations of the room with respect to the supine observer can be utilized to induce other illusions of self orientation. For example, when the floor of the room is placed above the supine observer, the observer feels convinced he or she is prone and looking down onto a floor in its natural position. In this case, the direction of gravity has been apparently reversed 180°, what is actually down appears "up" and a falling object appears to rise.

Figure 6:
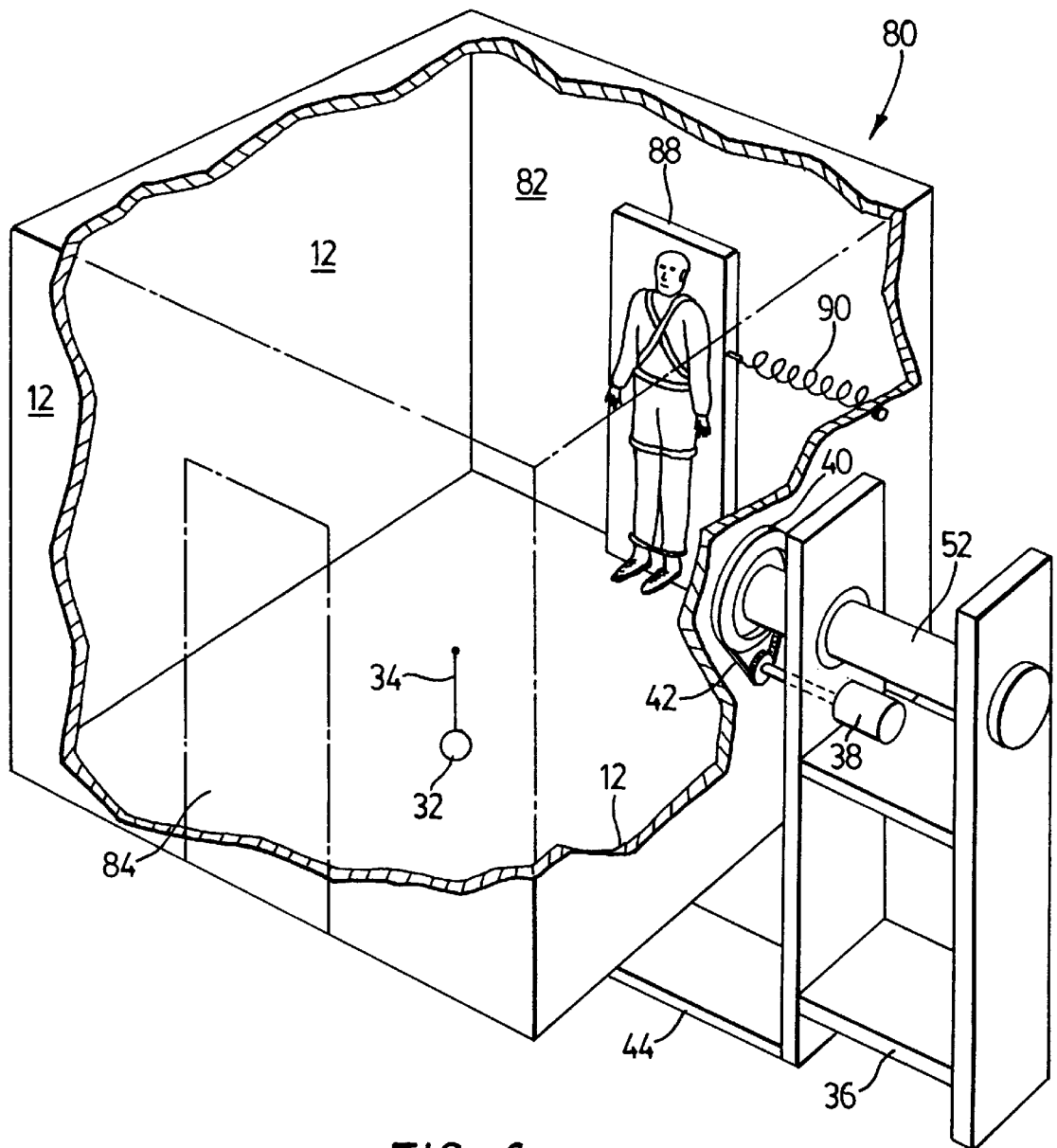
FIG. 6 is a perspective cut-away view of an alternative apparatus for simulating weightless conditions in the upright position.
Figure 7:
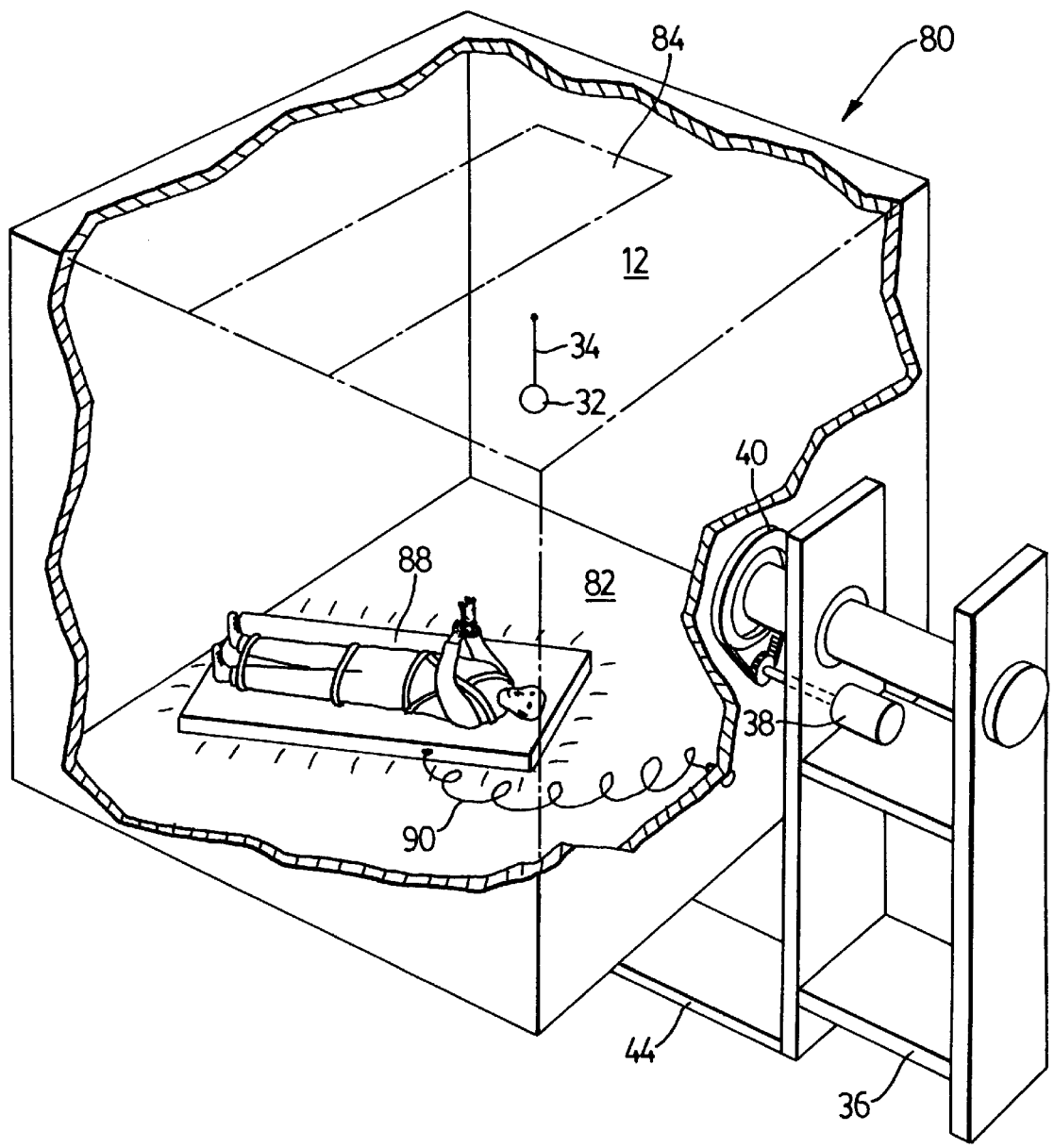
FIG. 7 is a perspective cut-away view similar to FIG. 6 but rotated back 90°.

FIGS. 6 and 7 illustrate another embodiment of the method and device for simulating weightlessness constructed in accordance with the present invention. An enclosed room 80 includes a planar back wall 82 as the user walks through door 84. A cushioned board 88 is clamped to wall 82 using for example magnetic clamps. Board 88 is provided with an air hose 90 coupled to an exterior compressed air supply (not shown). Hose 90 provides air to a series of air exhaust ports on the bottom of board 88 (not shown) to produce an air cushion under padded board 88 in the manner of a hover craft. The user is strapped to board 88 as shown in FIG. 6. The room 80 and board 88 are rotated together through 90° and bring the board into the horizontal plane with the user in the supine posture so that wall 82 is essentially the floor. The clamp holding board 88 in place is released and with air provided to board 88 it floats across surface 82.

The user is now free to move or rotate in a frictionless manner over the horizontal surface of back wall 82. Since the person has the illusion of being in the upright vertical standing posture in an upright room, he or she will have the illusion of levitating with respect to gravity. The experiences engendered by this situation resemble those experienced by astronauts in the weightless conditions of space. A supine observer on the frictionless hover craft platform 82 on an air cushion above the horizontal surface 82 can translate or rotate within what appears to be a vertical plane. This simulates the situation in which a weightless astronaut moves freely between the walls of a spacecraft. An observer on the hover craft support can handle tethered and seemingly weightless objects. The device thus provides an inexpensive way to train astronauts to experience the sensations of weightlessness, to seemingly float and move in a plane parallel to gravity and to learn to handle seemingly weightless objects. It also provides a means for anyone to experience sensations of weightlessness. No previous ground-based device provides this combination of features.

The various sensations experienced in space may be enhanced by modifications. For example, the hover craft board can be locked in position with the feet of the supine observer on the floor of the room. The VELCRO™ foot straps used by astronauts in the space shuttle can be placed over the feet to enhance the impression that the floor is down. Also, the elastic cords which astronauts attach between the waist and the floor for exercise purposes can be attached between the supine observer and the floor. This puts pressure on the feet in the direction of assumed gravity and thereby enhances the levitation illusion.

The method and device for simulating weightlessness as disclosed herein may be used as a training experience for pilots and astronauts to allow them to experience sensations of weightlessness before a space mission. The apparatus may form the basis of an entertainment device to allow the general public to experience what astronauts experience in space. For different training applications the enclosed chambers can be designed with particular motifs in mind, for example and spaceshuttle interior, an aircraft cockpit to mention just a few.

The foregoing description of the preferred embodiments of the method and apparatus of the invention have been presented to illustrate the principles of the invention and not to limit the invention to the particular embodiment illustrated. It is intended that the scope of the invention be defined by all of the embodiments encompassed within the following claims and their equivalents.

Therefore what is claimed is:

1. A method for producing an illusion of weightlessness, comprising:

a) providing an enclosed room containing visually polarized objects rigidly mounted in said room that indicate an up direction and a down direction with respect to gravity;

b) securing a user in a preselected position in said enclosed room and moving said user into a substantially supine posture; and c) moving said enclosed room to align it with the user's body in said substantially supine posture so that a true direction of gravity signaled by non-visual sense organs of said user's body is substantially orthogonal to an apparent direction of gravity signaled by visual sense organs of said user observing said visually polarized objects.

2. The method according to claim 1 wherein the step of moving said user includes rotation of the user and the step of moving said room includes rotating the room into alignment with the user's body.

3. The method according to claim 2 including providing a tethered object freely hanging in a first position in said enclosed room in an upright position, and wherein moving said room causes said tethered object to move from said first position to hang in a second position.

4. The method according to claim 2 wherein said step of moving said user into said supine position includes providing a cushioned support member mounted in said enclosed room, securing said user into said cushioned support member and rotating said support and user into said supine position.

5. The method according to claim 4 wherein said user strapped into said cushioned support member and said enclosed room are rotated together through 90° into the supine position.

6. The method according to claim 4 wherein said user strapped into said cushioned support member is first rotated into said supine position, and thereafter said enclosed room is rotated through 90° into alignment with the user's body.

7. The method according to claim 4 wherein after said user is rotated into said supine position and said room is rotated into alignment with the body of said user, releasing said cushioned support member and generating an air cushion below said cushioned support member so it can float on said air cushion in said enclosed room.

8. The method according to claim 1 including providing a tethered object freely hanging in a first position in said enclosed room in an upright position, and wherein moving said room causes said tethered object to move from said first position to hang in a second position.

9. A method for producing an illusion of weightlessness, comprising:

a) providing an enclosed room having walls, a floor and a ceiling defining an interior, and a plurality of visually polarized objects rigidly secured to said walls, ceiling or floor;

b) securing a user into a cushioned support member mounted in said enclosed room; and c) moving said support member until said user is in a supine position and moving said enclosed room until it is aligned with said user's body.

10. The method according to claim 9 wherein the step of moving said room and support member includes rotating said room and rotating said support member.

11. The method according to claim 10 wherein the step of providing said enclosed room includes providing a tethered object hanging in a first position in said enclosed room in an upright position, and wherein moving said room causes said tethered object to move from said first position to hang in a second position.

12. The method according to claim 11 wherein said room has a first axis of rotation and said support member has a second axis of rotation, said first and second axes of rotation being coincident.

13. An apparatus for producing an illusion of weightlessness, comprising:

a) an enclosed chamber having an interior and an entrance;

b) means for changing the position and orientation of said enclosed chamber;

c) support means located inside said enclosed chamber for supporting a user and means for securing said user to said support means;

d) means for changing the position and orientation of said support means relative to said chamber; and e) a plurality of visually polarized objects located in various positions within said chamber, said visually polarized objects being fixed in position relative to said chamber so as to be moveable with said chamber when said chamber is moved.

14. The apparatus according to claim 13 including at least one object attached to a flexible tether, the tether being anchored in the interior of said enclosed chamber, the object being within a field of view of said person located on said support means.

15. The apparatus according to claim 14 wherein said room has a first axis of rotation and said support member has a second axis of rotation, said first and second axes of rotation being coincident.

16. The apparatus according to claim 15 wherein said support means comprises a chair extending the full length of the user and having cushioned head, back and leg rest portions.

17. The apparatus according to claim 15 wherein said means for changing the position and orientation of said enclosed room includes a motor mounted on a frame located adjacent to said enclosed chamber and a pulley assembly connected said motor to said enclosed room.

18. The apparatus according to claim 15 wherein said means for changing the position and orientation of said enclosed chamber includes a motor mounted on a frame located adjacent to said enclosed chamber and a first gear attached to an outside wall of said enclosed chamber, said motor including a second gear meshed with said first gear for rotating said enclosed chamber.

19. The apparatus according to claim 15 wherein said means for changing the position and orientation of said support means relative to said chamber includes a motor mounted on a frame located adjacent to said enclosed chamber and a pulley assembly connecting said motor to said support means.

20. The apparatus according to claim 15 wherein said means for changing the position and orientation of said support means relative to said chamber includes a motor mounted on a frame located adjacent to said enclosed chamber, a shaft mounted on said frame having a first end portion connected to said motor for rotation thereof and a second end portion rigidly secured to said support means for rotating said support means.

21. The apparatus according to claim 14 wherein said support means comprises a cushioned support member extending the full length of the user.

22. The apparatus according to claim 14 wherein said cushioned support member includes a bottom portion having a foot rest and a top portion cushioned to receive a user's head so that said user can be secured to said cushioned support member in a standing position and subsequently rotated by substantially any angle with the user secured therein.

23. An apparatus for producing an illusion of weightlessness, comprising:

a) an enclosed chamber having an interior and an entrance;

b) means for rotating said enclosed chamber;

c) a support surface located on the interior of said chamber;

d) support member located inside said enclosed chamber for supporting a user and means for securing said user to said support member, said support member including means for producing an air cushion below said support member for elevating said support member above said support surface; and e) a plurality of visually polarized objects located in various positions within said chamber, said visually polarized objects being fixed in position relative to said chamber so as to be moveable with said chamber when said chamber is moved.

24. The apparatus according to claim 23 including at least one object attached to a flexible tether, the tether being anchored in the interior of said enclosed chamber within a field of view of said person located on said support means so that when the chamber is in an upright position said tethered object freely hangs vertically downwardly toward a floor of said chamber.

25. The apparatus according to claim 24 including clamping means for clamping said support member to said support surface.

26. The apparatus according to claim 25 wherein said enclosed chamber is a generally rectangular room having vertical walls, a roof and floor.

27. The apparatus according to claim 25 wherein said support surface extends between said roof and floor, said support member being a padded board sufficiently large to receive thereon a user in a supine position when said room and padded board are rotated through 90° to bring said padded board and support member to a horizontal position with said padded board above said support member.

28. The apparatus according to claim 27 wherein said means for rotating said enclosed chamber includes a motor mounted on a frame located adjacent to said enclosed chamber and a first gear attached to an outside wall of said enclosed chamber, said motor including a second gear meshed with said first gear for rotating said enclosed chamber.

* * * * *